United States Patent
Höfer et al.

(10) Patent No.: US 6,370,150 B1
(45) Date of Patent: Apr. 9, 2002

(54) $S_0$-INTERFACE FOR AN ISDN BASE CONNECTION

(75) Inventors: Gerald Höfer, Langerringen; Pidder Kassel, Furth; Ulrich Tomalla, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/189,252

(22) Filed: Nov. 10, 1998

Related U.S. Application Data

(63) Continuation of application No. PCT/DE98/00369, filed on Feb. 10, 1998.

(51) Int. Cl.[7] .............................................. H04J 15/00
(52) U.S. Cl. ...................... 370/419; 370/420; 370/463; 379/402
(58) Field of Search ................................. 370/280, 419, 370/420, 463, 522, 524, 282; 379/402

(56) References Cited

U.S. PATENT DOCUMENTS

| | | | | |
|---|---|---|---|---|
| 4,592,047 A | * | 5/1986 | Fundneider | 370/420 |
| 4,797,904 A | * | 1/1989 | Dekker et al. | 375/296 |
| 4,953,055 A | * | 8/1990 | Douhet et al. | 361/62 |
| 5,142,429 A | * | 8/1992 | Jaki | 361/56 |
| 5,144,544 A | * | 9/1992 | Jenneve et al. | 363/49 |
| 5,479,504 A | | 12/1995 | Nakano et al. | 379/402 |
| 5,526,416 A | * | 6/1996 | Dezonno et al. | 379/202.01 |
| 5,566,166 A | * | 10/1996 | Lee et al. | 370/282 |

FOREIGN PATENT DOCUMENTS

| | | |
|---|---|---|
| DE | 92 14 142.0 | 5/1993 |
| DE | 42 33 682 A1 | 4/1994 |
| DE | 44 23 333 C1 | 8/1995 |

OTHER PUBLICATIONS

International Application WO 95/35607 (Hoffmann), dated Dec. 28,1995.

Shizuo Nakano et al.: "Design and Electrical Characteristic Evaluation for Interface Circuit in ISDN Bus Wiring System", Electronics and Communications in Japan, Part I, vol. 73, No. 12, 1990, p. 9–20.

* cited by examiner

*Primary Examiner*—Min Jung
(74) *Attorney, Agent, or Firm*—Herbert L. Lerner; Laurence A. Greenberg; Werner H. Stemer

(57) ABSTRACT

The $S_0$-interface for ISDN base access connects a four-wire line with a receiver line pair and a transmitter line pair to an ISDN terminal device, subject to potential separation within the interface. Each of the receiver lines has a respective capacitor for potential separation and the transmitter lines have a transformer. An inductance is connected into each receiver line and each transmitter line on the interface side. Preferably, the receiver line pair is connected to a voltage amplifier on the device side. The voltage amplifier has a voltage amplification in the same ratio as the voltage amplification of the transformer in the transmitter line pair.

4 Claims, 1 Drawing Sheet

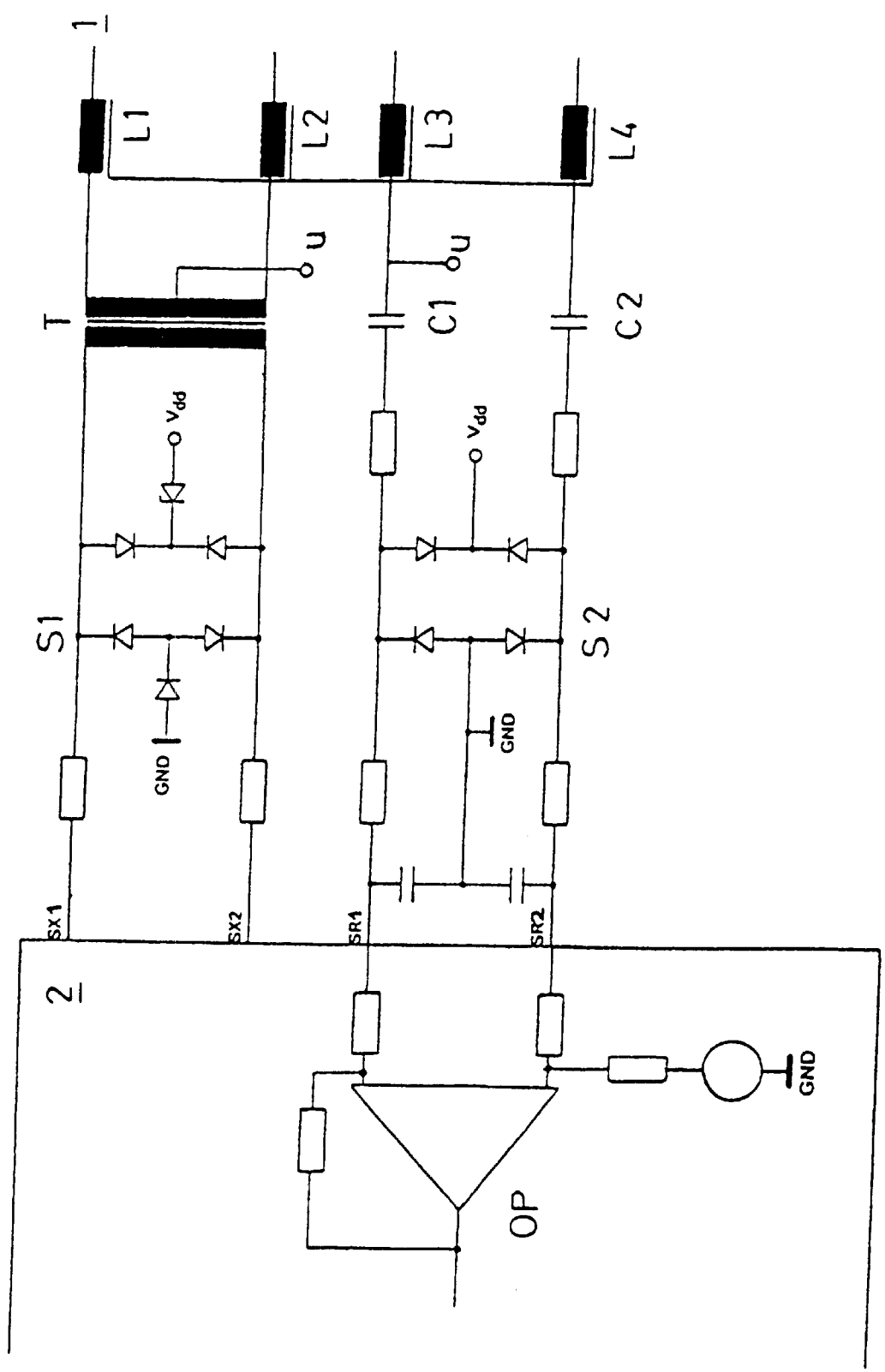

$S_0$-INTERFACE FOR AN ISDN BASE CONNECTION

CROSS-REFERENCE TO RELATED APPLICATION

This is a continuation of copending international application PCT/DE98/00369, filed Feb. 10, 1998, which designated the United States.

BACKGROUND OF THE INVENTION

Field of the Invention

The invention relates to an $S_0$-Interface for an ISDN base connection, through which a four-wire line with a receiver line pair and a transmitter line pair is connected, with potential separation, to an ISDN terminal device.

The double line coming in from an ISDN network is usually converted to a four-wire interface at a network socket of a user. That interface between the ISDN network and the terminal device is referred to as an $S_0$-interface. The four-wire line is divided into a receiver line pair for incoming signals and a transmitter line pair for outgoing signals. The transmission-technological functions of the four-wire duplex process are implemented with a so-called $S_0$-component, whereby the connection between the lines and the $S_0$-component are obtained, via potential separation, with a respective transformer in the receiver line pair and in the transmitter line pair.

That potential separation has the disadvantage of increased damping due to parasitic ohmic loading by the transformer. Furthermore, the transformers that are required are relatively expensive.

The use of transformers may lead to problems in remote feeds. Insufficiently current-compensated transformers may reach saturation due to the direct current of the remote feed, which reduces the reach of the $S_0$-interface.

SUMMARY OF THE INVENTION

It is accordingly an object of the invention to provide an $S_0$-interface for an ISDN basic access connection, which overcomes the above-mentioned disadvantages of the heretofore-known devices and methods of this general type and which can be produced more inexpensively, yet satisfies the high demands for transmission quality.

With the foregoing and other objects in view there is provided, in accordance with the invention, an $S_0$-interface for an ISDN base connection, comprising:

- a four wire line with a pair of receiver lines and a pair of transmitter lines, the four wire line having an interface side and a device side;
- a capacitor connected in each of the receiver line for potential separation between the interface side and the device side;
- a transformer connected in the pair of transmitter lines for potential separation between the interface side and the device side; and
- an inductance connected in each of the receiver lines and the transmitter lines on the interface side thereof.

In accordance with an added feature of the invention, each of the inductances is a winding with a respective core. In accordance with an alternative feature, the inductances have a common core.

In accordance with a concomitant feature of the invention, a voltage amplifier is connected to the pair of receiver lines at the device side thereof. The voltage amplifier having a voltage amplification equal to a voltage amplification of the transformer in the pair of transmitter lines.

The invention provides for the advantage that, in spite of principally different transmission characteristics between a transformer and a capacitor, the receiver line pair as well allows reaching an equally good transmission quality. Furthermore, there is provided protection for the $S_0$-interface against lightning spikes. By connecting the line ends to a voltage amplifier it is prevented that incoming information may not be detected if the input level falls below a certain signal threshold. The voltage level detection may be dependably achieved by that compensation.

Other features which are considered as characteristic for the invention are set forth in the appended claims.

Although the invention is illustrated and described herein as embodied in an $S_0$-interface for an ISDN terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawing.

BRIEF DESCRIPTION OF THE DRAWINGS

The sole FIGURE is a schematic of the connection of an $S_0$ bus for potential separation.

DESCRIPTION OF THE PREFERRED EMBODIMENTS

Referring now to the sole figure of the drawing in detail, a four-wire line 1 exemplifies the connection between a network terminal at an ISDN base connection (not illustrated) and a control component 2 at the transition to a user interface $S_o$. The four-wire line 1 consists of a receiver line pair SR1, SR2 and a transmitter line pair SX1, SX2. The interface-side of the four-wire line 1 is separated in terms of potential from the device-side line. The potential separation in the transmitter line pair SX1, SX2 is effected by a transformer. T, which usually has a transformer ratio of 2:1 from the device side to the interface side. The potential separation in the receiver line pair SR1, SR2 is effected with a capacitor C1 and C2 respectively connected in each line. The feed-in points of the remote feed voltage are identified with U.

The two receiver lines SR1, SR2 and the transmitter lines SX1, SX2 are each connected at the interface side to a respective inductance L1, L2, L3, L4 with a common core. Inter alia, this assures lightening protection for the device-side components.

In a practical application, capacitances are suitable with a rated value in the range from about 1 nF to about 5 nF with network voltages of up to 5 kV. The transmitter line pair SX1, SX2 and the receiver line pair SR1, SR2 are respectively provided on the device side of the potential separation with line overvoltage protective circuits S1, S2, which consist essentially of a respective diode network. Such protective networks are well known to those skilled in that art and they will, therefore, not be described in more detail.

Inside the control component 2, the line ends of the receiver line pair SR1, SR2 are connected to the inputs of a voltage amplifier OP, which, preferably, has the same voltage amplification ratio as the transformer T. In the present example, the amplification of the voltage amplifier OP is 2:1. The voltage amplifier OP produces a minimum input level so as to avoid that the input level at the receiver line pair SR1, SR2 falls below a certain threshold, which can lead to transmission errors.

We claim:

1. An $S_0$-interface for an ISDN base connection, comprising:

a four wire line with a pair of receiver lines and a pair of transmitter lines, said four wire line having an interface side and a device side;

a capacitor connected in each of said receiver line for potential separation between the interface side and the device side;

a transformer connected in said pair of transmitter lines for potential separation between the interface side and the device side; and an inductance connected in each of said receiver lines and said transmitter lines on the interface side thereof.

2. The interface according to claim 1, wherein each of said inductances is a winding with a respective core.

3. The interface according to claim 1, wherein said inductances have a common core.

4. The interface according to claim 1, which further comprises a voltage amplifier connected to said pair of receiver lines at the device side thereof, said voltage amplifier having a voltage amplification equal to a voltage amplification of said transformer in said pair of transmitter lines.

* * * * *